United States Patent [19]

Hochstrasser et al.

[11] Patent Number: 4,511,125
[45] Date of Patent: Apr. 16, 1985

[54] LADLE SCRAPER MECHANISM

[75] Inventors: Otto Hochstrasser, Franklin Park; Hans G. Heine, Little Silver; Heinz Buechi, North Brunswick, all of N.J.

[73] Assignee: BBC Brown Boveri, Inc., North Brunswick, N.J.

[21] Appl. No.: 553,144

[22] Filed: Nov. 18, 1983

[51] Int. Cl.³ .............................................. F27D 23/02
[52] U.S. Cl. .................................. 266/135; 266/281; 266/287
[58] Field of Search ................ 266/44, 135, 281, 287; 15/104.1 C, 104.16; 299/70

[56] References Cited

U.S. PATENT DOCUMENTS

| | | | |
|---|---|---|---|
| 1,862,751 | 6/1932 | Ingraham | 266/135 |
| 3,258,246 | 10/1963 | Brooke | 266/135 |
| 3,507,408 | 1/1968 | Bramwell | 214/23 |
| 3,627,291 | 12/1971 | Montgomery et al. | 266/135 |
| 3,736,615 | 6/1973 | Kumaki | 266/135 |
| 4,095,306 | 6/1978 | Norton | 15/104.07 |
| 4,210,976 | 7/1980 | Apelt et al. | 15/246.5 |
| 4,328,959 | 5/1982 | Holtmann | 266/281 |

FOREIGN PATENT DOCUMENTS

| | | | |
|---|---|---|---|
| 0388842 | 11/1973 | U.S.S.R. | 266/281 |
| 647022 | 2/1979 | U.S.S.R. | |

Primary Examiner—M. J. Andrews
Assistant Examiner—S. Kastler
Attorney, Agent, or Firm—Fitzpatrick, Cella, Harper & Scinto

[57] ABSTRACT

A ladle scraper mechanism 20 comprises an outer frame 44 which supports and guides a carrier assembly 58 for up and down movement to move scraper legs 57, with scraper blades 72 at their lower ends, down along the lining of a ladle 22 containing a bath 40 of molten metal while vibrators 70 on the top of the legs vibrate them and pneumatic actuators 68 on the carrier assembly force the legs to swing radially outwardly against the ladle walls.

19 Claims, 15 Drawing Figures

LADLE SCRAPER MECHANISM

BACKGROUND OF THE INVENTION

1. Field of the Invention

This invention relates to machinery for scraping incrustations from the inner surfaces of ladles and more particularly it concerns improvements to such machinery which permit scraping to be carried out without removal of the molten contents of the ladle.

2. Description of the Prior Art

In the processing or refining of various metals, particularly non-ferrous metals, the metal is held in the molten state in a ladle. Often the ladle is provided with an electrical coil which surrounds the ladle and which receives alternating electrical current to maintain the molten contents of the ladle in a heated and agitated state. During this time impurities separate from the metal and collect near the top of the ladle in the form a floating slag which can easily be removed. A certain amount of the impurities, however, become adhered to the sides of the ladle and build up as incrustations which interfere with the proper operation of the ladle.

The most common technique used in the past to remove these incrustations involved manual scraping after the ladle was emptied of its contents. However, once the ladle is emptied and the incrustations become cooled and exposed to the atmosphere, they harden and become extremely difficult to remove. The ladle may be scraped manually while it still contains the molten metal but this is obviously a dangerous and physically exhausting procedure.

Various mechanical devices have been proposed for automatically scraping incrustations from the inner surfaces of ladles; however, these devices all have inherent problems. Specifically, they all require moveable linkages or joints in the vicinity of the ladle lining and these linkages or joints become rigid as the molten metal surrounding them solidifies. In most cases these mechanical devices are used only when the ladle has been emptied; however, as mentioned above, the incrustations become much harder and more difficult to remove after the ladle has been emptied.

Examples of previously proposed mechanical devices are shown and described in U.S. Pat. Nos. 1,862,751 to Ingraham, 3,736,615 to Kumaki, 4,095,306 to Norton, 4,210,976 to Apelt et al and 4,328,959 to Holtmann, as well as U.S.S.R. Pat. No. 647,022 to Nizhnetagil Metallu. The Ingraham patent shows a ring shaped scraper which is lowered down into a ladle by means of a chain. This device, in addition to using an articulated chain in the ladle bath, has no means for forcing the scraper elements against the ladle walls nor does it have any means for forceably scraping in the downward direction. The Kumaki patent shows a power driven impact hammer mounted under the surface of the bath in a ladle but the device requires that the ladle first be emptied of its contents and it further requires elaborate cooling means surrounding the hammer. The Norton patent shows an articulated scraper mechanism which also cannot be operated in a molten ladle bath. The Apelt et al patent shows the use of chain or mechanical link supported scraping elements forced outwardly, by centrifugal action, to the sides of the ladle. These, of course, could not operate while submerged in a bath of molten metal in the ladle. The Holtmann patent shows mechanically driven cutter blades and articulated clamp elements wich could not be used in a molten bath. The U.S.S.R. patent also shows articulated scraper legs with pivotal joints and actuator devices which are located inside a ladle and which could not be used unless the ladle has been emptied.

SUMMARY OF THE INVENTION

The present invention overcomes these problems of the prior art and provides a ladle scraper mechanism which can be used reliably to scrape the interior of a ladle containing a bath of molten metal. According to the invention there is provided a frame with a vertical guide, a carrier assembly guided for up and down movement by the guide on the frame, at least one elongated scraper leg having a scraper element at its lower end with a vibrator mounted on its upper end and a scraper leg mounting means on the carrier assembly. The scraper leg mounting means includes a flexible element arranged to permit limited vertical movement of the scraper leg relative, to the carrier assembly. The scraper leg itself contains no moving parts and the other moveable parts of the mechanism, including the carrier assembly, the leg mounting means and the vibrator, are all located above the ladle so that as the carrier assembly is lowered on the frame, only the scraper leg and scraper blade move down along the surface of the ladle within the bath of molten metal in the ladle.

The invention, in its more specific aspects, incorporates a pivoted mounting arrangement for the upper end of the scraper leg; and it further incorporates actuators for causing the leg to pivot outwardly and bring the scraper blade against the side of the ladle.

The invention also incorporates, in its more specific aspects, a novel frame and carrier assembly wherein the carrier assembly has an inner portion which includes the leg mounting means and an outer portion which includes rollers which in turn are guided for up and down movement along the frame and a rotary conection between the inner and outer carrier assembly portions. This allows the carrier assembly to be rotated after each downward scraping pass along the ladle wall so that the scraper elements may, in a subsequent scraping pass, scrape along a different segment of the ladle wall surface.

BRIEF DESCRIPTION OF THE DRAWINGS

A preferred embodiment of the invention has been chosen for purposes of illustration and description and is shown in the accompanying drawings, forming a part of the specification, wherein.

DETAILED DESCRIPTION OF A PREFERRED EMBODIMENT

Figure 1:
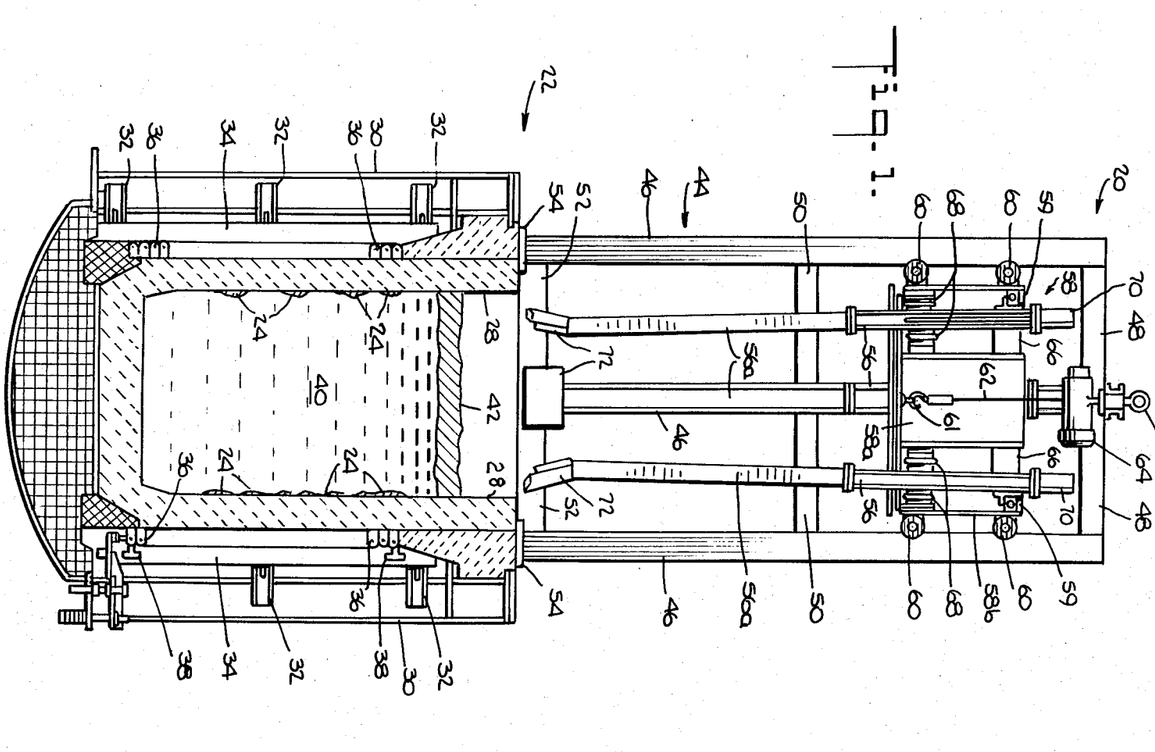
FIG. 1 is an elevational view, partially in section, showing a ladle scraper mechanism according to the present invention in starting position and mounted on a ladle.
Figure 2:
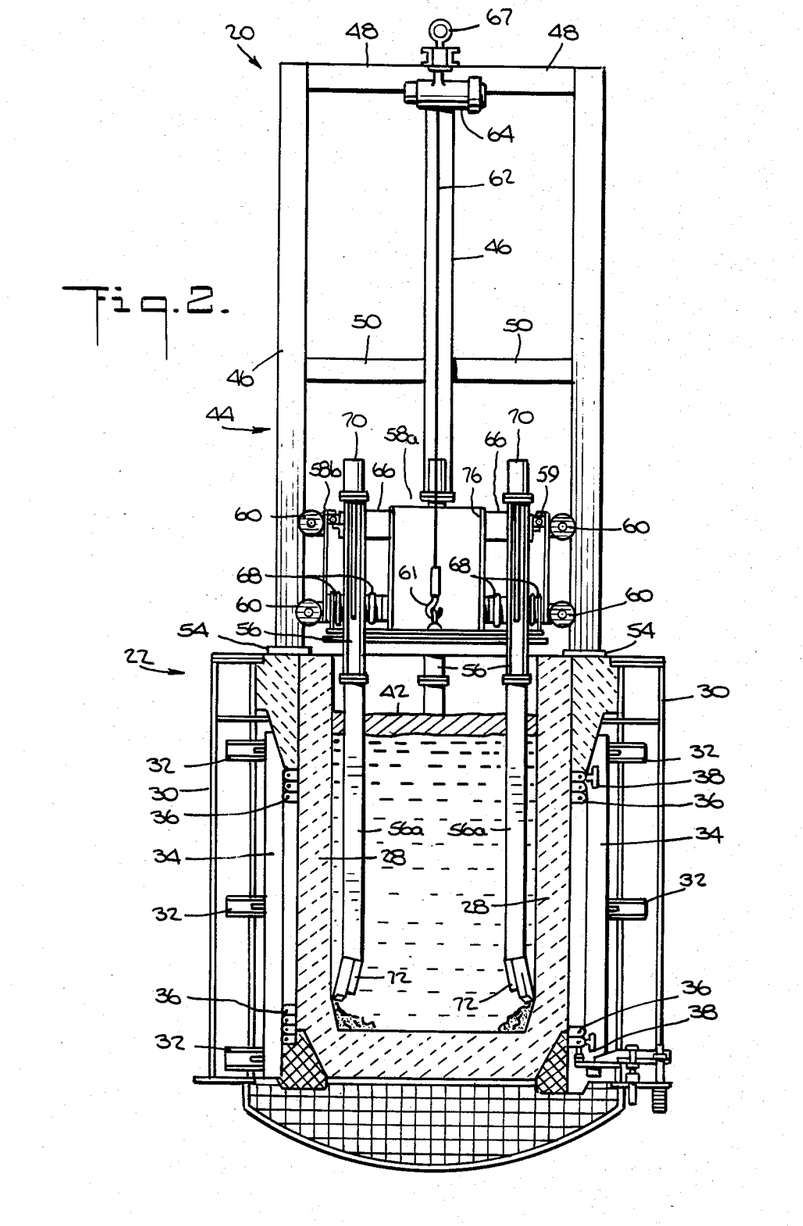
FIG. 2 is a view similar to FIG. 1 but showing the ladle scraper mechanism at the end of one step of a ladle scraping operation.
Figure 3:
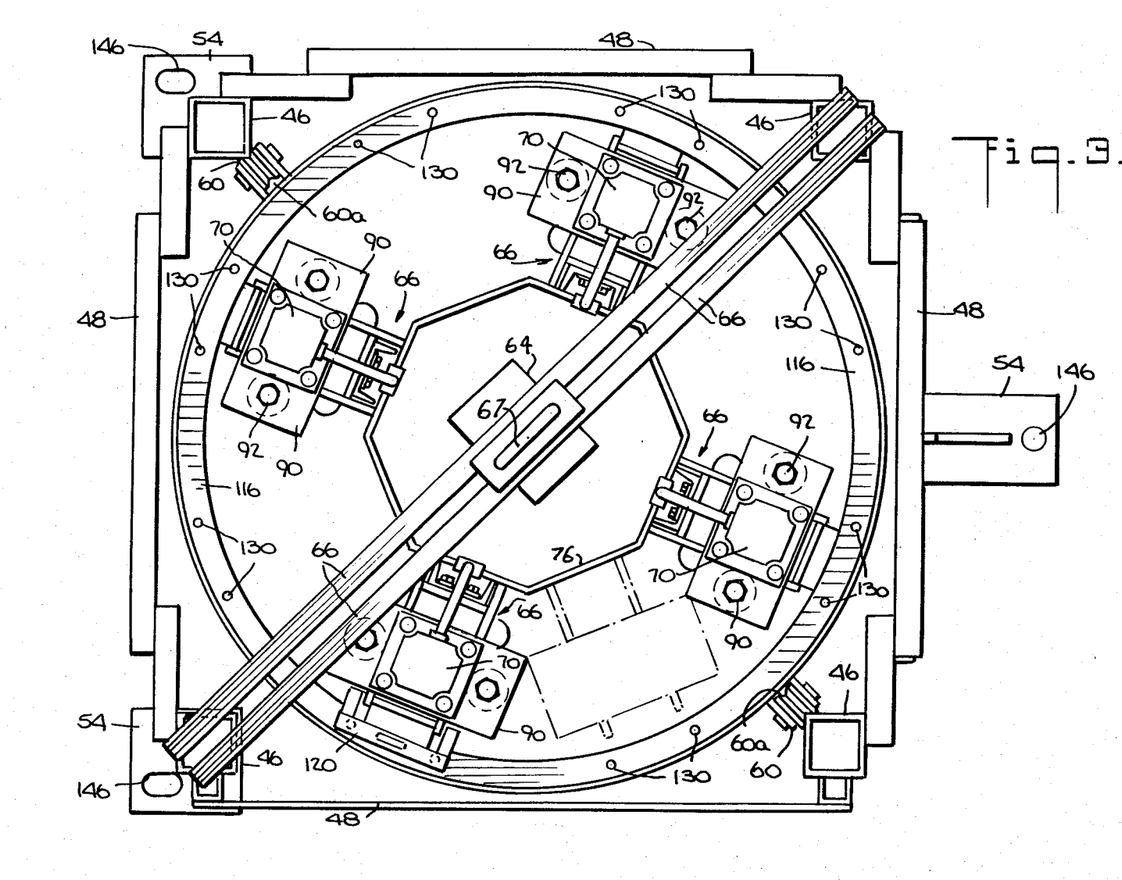
FIG. 3 is an enlarged top view of the ladle scraping mechanism of FIG. 1.

As shown in FIGS. 1, 2 and 3, a scraping mechanism 20 is mounted on a ladle 22 in preparation for scraping incrustations 24 off the walls 26 of an internal refractory lining 28 of the ladle. By way of example, the ladle 22 shown in FIG. 1 is an aluminum melting ladle and it is made up of an outer cylindrical steel shell or frame 30 containing spacers 32 which laminated yokes 34. The refractory lining 28 is supported inside the yokes 34 and an electrical coil 36 is arranged between the lining 28 and the yokes 34. The ladle 22 is closed at its lower end but is open at the top. Electrical connections are made at terminals 38 from an external alternating current source (not shown) which causes the coil 36 to set up inductive heating in a bath 40 of aluminum contained in the refractory lining 28. The heating of the molten aluminum causes impurities to separate out from the aluminum and principally to collect as a slag 42 which floats on top of the bath 40. The separation of the slag is enhanced by a stirring action produced in the bath by the inductive fields from the coil 36.

While most of the impurities released from the molten aluminum collect in the slag 42, some do become entrapped by and build up as incrustations 24 along the walls of the refractory lining 28. The scraping mechanism 20 removes these incrustations without need to remove the molten aluminum from the ladle.

As shown in FIG. 1, the scraping mechanism 20 comprises a boxlike steel frame 44 made up of four vertical frame legs 46 interconnected by upper, intermediate and lower cross members 48, 50 and 52. The lower ends of the vertical frame legs 46 are provided with feet 54 which, as will be described hereinafter, are clamped to the upper end of the ladle 22. The frame legs 46 themselves are tubular stell constructions of square cross section; and the cross members 48, 50 and 52 are of channel shaped cross section.

Four elongated scraper legs 56, formed from square cross-section beams extend downwardly from different quadrants of a scraper leg carrier assembly 58 mounted inside the frame. The carrier assembly 58 is provided with rollers 60 having V-shaped grooves 60a (FIG. 3) in their peripherie which engage and are guided for up and down movement along one corner of the vertical frame legs 46. The carrier assembly 58 is suspended by means of a swivelled hook and eye connection 61 and a supporting cable 62 from a pneumatic hoist 64 which in turn is mounted on diagonal cross bars 66 (FIG. 3) extending across the upper end of the frame 44. Actuation of the pneumatic hoist 64 causes the carrier assembly 58 to move up and down inside the frame 44. A lifting eye 67 is fixed to the top of the frame 44 for lifting the frame up onto ladle 20.

The carrier 58 is provided with scraper leg mounting means 66 and the upper ends of the scraper legs 56 are mounted to pivot about horizontal axes on these mounting means so that the lower ends of the legs swing inwardly and outwardly in radial directions relative to the longitudinal vertical axis of the ladle 22 and the frame 44. This moves the lower ends of the legs toward and away from the lining 28 of the ladle.

Pneumatic actuators 68 are mounted on the carrier assembly 58 beneath the scraper leg supports 66 and these actuators engage the scraper legs 56 and move them radially inwardly and outwardly.

Pneumatic vibrators 70 are mounted on the upper ends of the legs 56; and, when actuated, these vibrators cause the legs to vibrate rapidly in a longitudinal direction.

The lower ends of the scraper legs 56 are provided with scraper blades 72 which are inclined outwardly and which are curved to conform to the inner surface contour of the ladle 22. Each of the four scraper blades extends over a segment of 45° or one eighth the circumference of the ladle and it is provided with a hardened lower edge for scraping along the surface of the ladle.

In operation, the scraping mechanism 20 is mounted on the open upper end of the ladle 22 as shown in FIG. 1. As can be seen, the ladle 22 is filled with a bath 40 of molten material, for example, molten aluminum. The pneumatic hoist 64 initially maintains the carrier assembly 58 near the top of the frame 44 so that the scraper legs 56 and the scraper blades 72 are held up out the bath 40. At this time the pneumatic actuators 66 are actuated to pivot the legs and retract their lower ends radially inwardly so that the scraper blades 72 will fit inside the ladle interior. The hoist 64 then lowers the carrier by an amount sufficient to bring the scraper blades down inside the ladle near its upper end and the pneumatic actuators 68 are then operated to swing the scraper legs 56 outwardly so that the scraper blades 72 press against the lining 28 near the top of the ladle. With the scraper legs 56 held in this position, the vibrators 70 are actuated to cause the legs 56 and the scraper blades 72 to vibrate rapidly up and down along the ladle lining 28. The hoist 64 is then operated to lower the carrier assembly 58 downwardly inside the frame 44 which guides the carrier so that the vibrating scraper blades 72 scrape down along the length of the ladle lining to the position shown in FIG. 2. As the blades 72 are so guided, their vibratory movement allows them to scrape off the incrustations 24 from wall of the lining 28. These incrustations are then carried away in the bath 40.

In order to permit the scraping mechanism 20 to scrape the entire length of the ladle 22, the length of the vertical frame legs 46 must be sufficient to permit vertical travel of the carrier assembly 58 by an amount at least as great as the vertical length of the ladle interior. In order to accommodate ladles of different vertical length the scraper legs 56 may be provided with replaceable extension portions 56a of different lengths between the upper ends of the legs and the scraper blades 72.

After the ladle has been so scraped, the carrier assembly 58 is raised and rotated on the swivelled hook and eye connection 61 by 45° to bring the scraper blades 72 to a new position in the ladle 22 and the above described scraping process is repeated to remove the remaining incrustations from the ladle.

While the scraping mechanism 20 will operate to scrape incrustations from an empty ladle, it is of particular advantage this mechanism can operate while the ladle contains molten material. This not only saves considerable time and inconvenience but it also makes the scraping operation more effective since the incrustations 24 are usually softer and more easily removed when they are submerged in the molten bath. It will be appreciated that the only portions of the scraper mechanism which enter the molten bath are the scraper legs 56 and the blades 72. Since these parts do not move relative to each other there is no danger of jamming or fouling from the molten contents of the ladle.

As can be seen in FIG. 1, the carrier assembly 58 is made up of an inner portion 58a and an outer portion 58b interconnected by a ring bearing 59. The inner carrier portion 58a includes the scraper leg mounting means 66 which support the scraper legs 56 and it also includes the hook and eye connection 61 to the supporting cable 62. The outer carrier portion 58b contains the rollers 60 which guide the carrier along the vertical legs 46.

The detailed construction of the inner and outer carrier assembly portions 58a and 58b is illustrated in FIGS. 3–6. As can be seen, the inner carrier portion 58a is made up of a horizontal steel bottom plate 74 on which an upright carrier body 76 is mounted. The carrier body is formed of vertical steel plates welded together in an octagonal array and welded at their lower ends to the bottom plate 74. The swivelled hook and eye connection 61 is attached to the bottom plate 74 inside the carrier body 76.

As shown in FIGS. 3–6, the scraper leg mounting means 66 each comprise a pair of spaced apart steel plates 78 welded to and extending radially out from the carrier body 76 near its upper end and a spacer plate 80 welded between the plates 78 near their outer end. Cylindrical vibration damper mounts 82 are welded along the outside surfaces of each of the plates 78. These mounts are standard mounting elements and they comprise a tubular outer steel casing 84 containing an inner rubber damper element 86. The damper elements are each formed with an axial bore 88. A suitable damper mount of this construction is available as part No. H-9004 from the Lord Corporation, 1635 West 12th Street, Erie, Pennsylvania.

Figure 5:
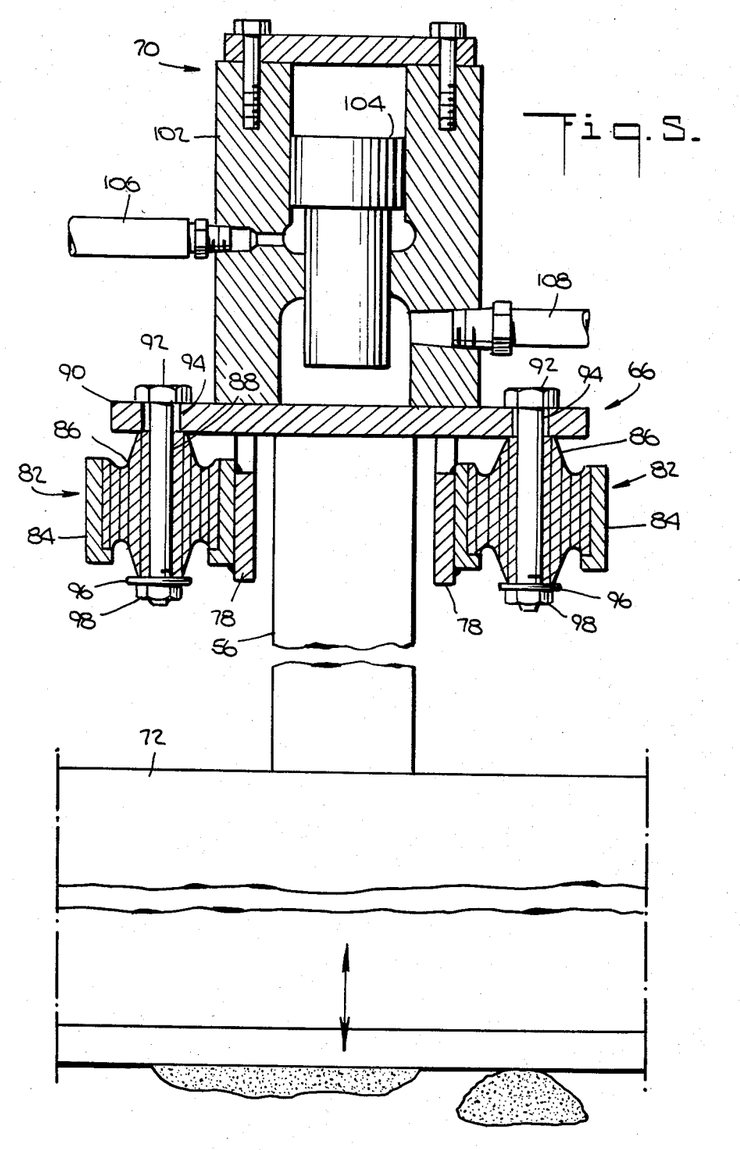
FIG. 5 is a view taken along line 5—5 of FIG. 4.

As shown in FIG. 5, the upper end of each scraper leg 56 extends up between the plates 78 of an associated mounting means 66. A horizontal mounting plate 90 is welded to and extends across the top of the scraper leg 56. The plate 90 also extends over the damper mounts 82; and connector bolts 92 pass through holes 94 in the plate 90 and through the axial bores 88 in the damper elements 86. The bolts are secured at their lower ends by washers 96 and nuts 98. This scraper leg mounting arrangement permits the scraper legs 56 to undergo limited up and down movement relative to the carrier assembly 58; and it also permits limited pivotal movement of the scraper leg about a horizontal axis passing through the damper mounts so that the lower ends of the scraper legs can swing in and out in a radial direction relative to the surface of the lining in the ladle.

The pneumatic vibrator 70 is mounted on the horizontal plate 90 to cause longitudinal vibrating movement of the scraper leg 56. This vibrator is a standard device and accordingly will not be described in detail except to state that it comprises a housing 102 containing a free piston 104. Air inlet and exhaust lines 106 and 108 are connected to the housing in such a manner that the piston is caused to move up and down rapidly when pressurized air from an external source (not shown) is applied at the inlet air line 106. A piston type air driven vibrator suitable for this purpose is available from the Cleveland Vibrator Co., 2827 Clinton Avenue, Cleveland, Ohio 44113. It will be noted that the vibrator 70 is not directly connected to the carrier assembly 58 or to any other part of the device except the upper end of the scraper leg. Thus all vibrating forces (except those which may be transmitted through the damper mounts 92) are isolated from the carrier and are directed exclusively to the scraper leg 56.

Figure 4:
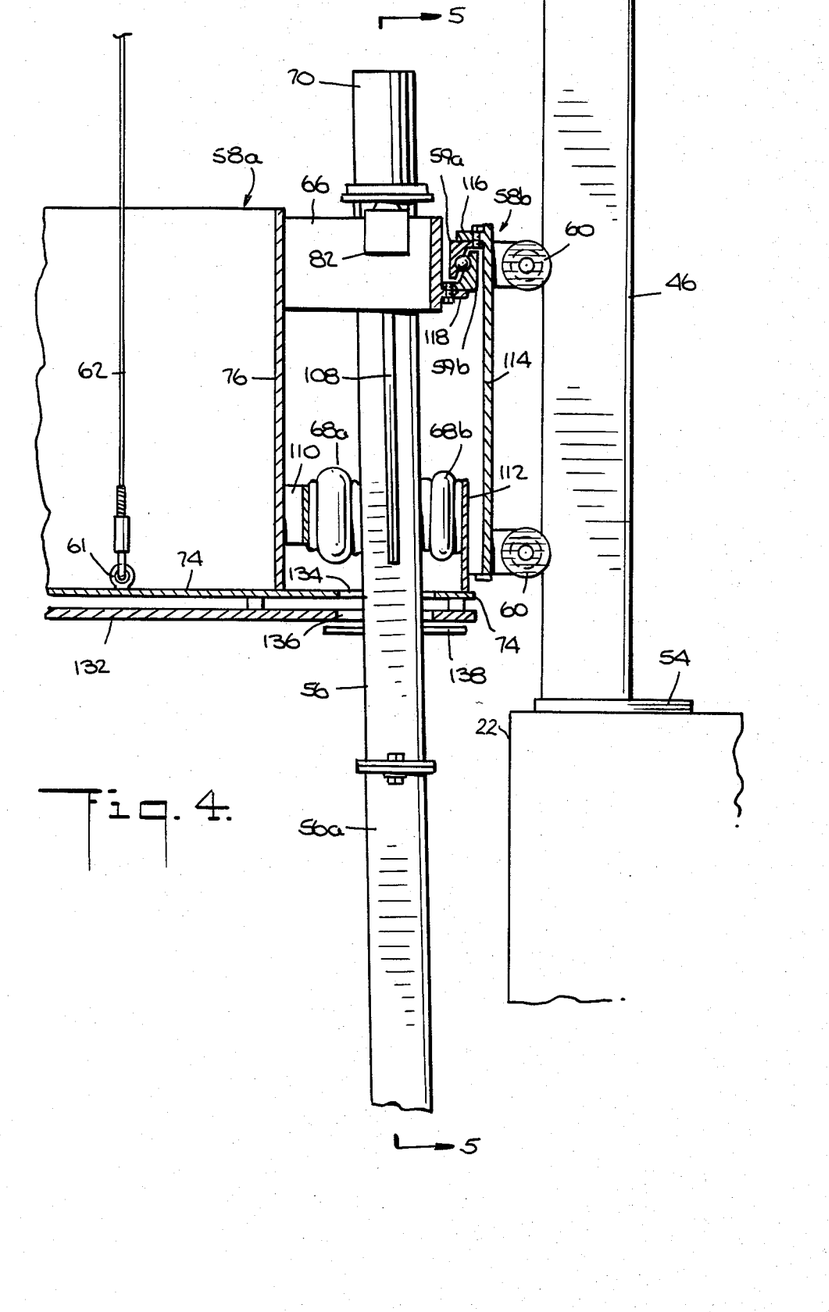
FIG. 4 is an enlarged fragmentary elevational view showing a scraper leg supporting arrangement forming part of the mechanism of FIG. 1.

The pneumatic actuators 68 are also mounted on the inner portion 58a of the carrier assembly 58. As shown in FIG. 4, these actuators each include an inner and outer actuator elements 68a and 68b arranged on opposite sides of an associated scraper leg 56 a short distance below the scraper leg mounting means 56. The inner actuator element 68a is supported on a bracket 110 extending out from the carrier body 76 while the outer actuator element 68b is supported on a steel actuator support ring 112 extending up from and included the outer edge of the horizontal bottom plate 74. The actuator elements 68a and 68b are essentially rubber bellows provided with pressurized air supply lines (not shown) and which extend in response to applied pressurized air. Suitable actuators of this type are sold under the registered trademark AIRSTROKE by the Firestone Tire & Rubber Co., 1200 Firestone Parkway, Akron, Ohio 44317. These actuators also have inherent lateral flexibility to accommodate the up and down vibrating movements of the scraper legs 56. As shown, the actuator elements 68a and 68b press against the scraper leg 56 from opposite directions at a location below the scraper mounting means 66; and by proper control of the pressure applied to the actuator portions they force the scraper leg to swing about a horizontal axis at the mounting means 66 so that the lower end of the scraper leg swings radially outwardly toward the inner wall of the ladle 20 or inwardly away from the wall.

The detailed construction of the outer portion 58b of the carrier 58 is also shown in FIGS. 3–6. As can be seen, the outer portion comprises a ring shaped roller support 14 which surrounds the inner portion 58a of the carrier and which carries the rollers 60. As shown in FIG. 4 there are provided two rollers at each frame leg 46 vertically spaced apart on the roller support 114. This provides a stable and firm guiding arrangement for the carrier assembly 58 within the frame 44.

Figure 6:
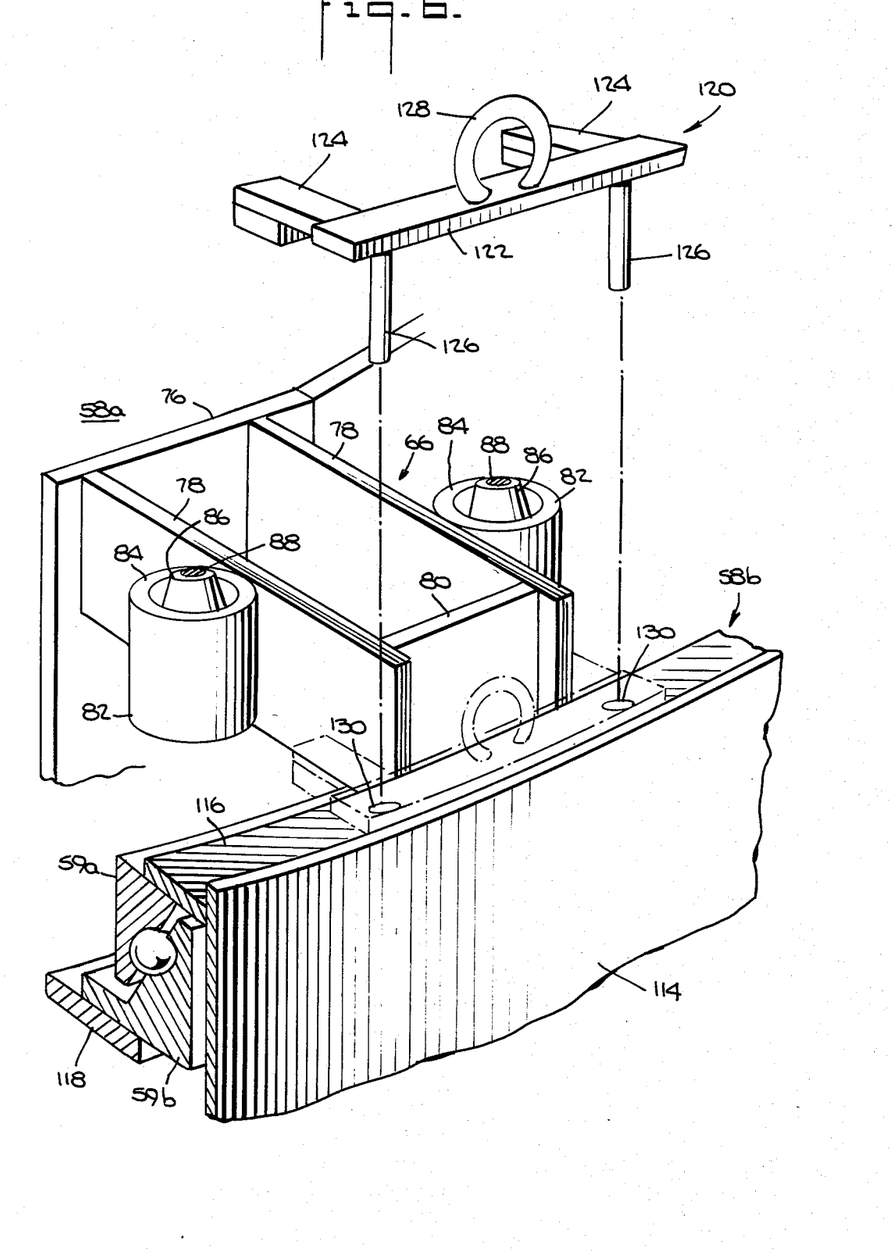
FIG. 6 is an exploded perspective view showing in further detail the scraper blade supporting arrangment including a rotational support and locking mechanism.

The ring bearing 59 which rotatably interconnects the inner and outer carrier assembly portions 58a and 58b is positioned near the upper ends of these portions. As shown in FIGS. 4 and 6, the ring shaped roller support 114 is provided with an inwardly extending bearing support flange 116 at its upper end and a circular, non-rotating upper bearing race 59a is affixed to this flange.

A circular, rotating bearing race 59b of the ring bearing 59 is connected to a ring-like carrier flange 118 of the carrier body 76 (FIG. 4). This flange is welded to the outer ends of the scraper leg supports 66.

Figure 7:
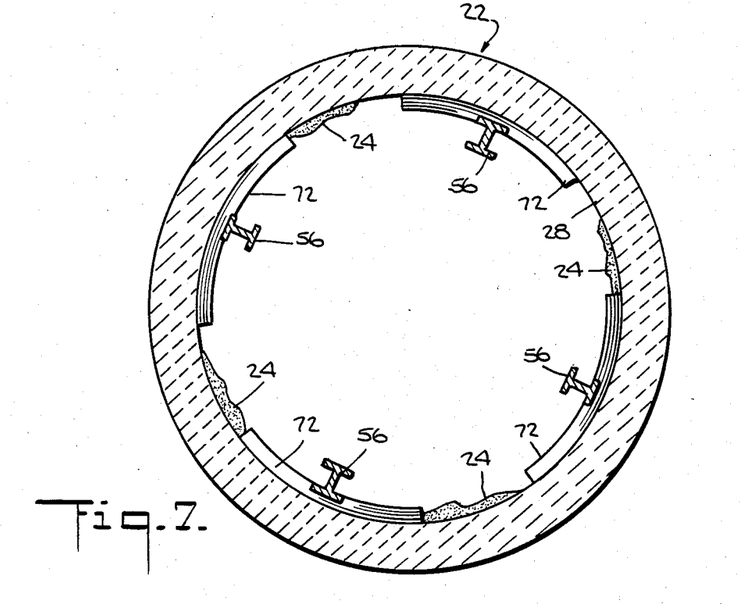
FIG. 7 is a view taken along line 7—7 of FIG. 3.
Figure 8:
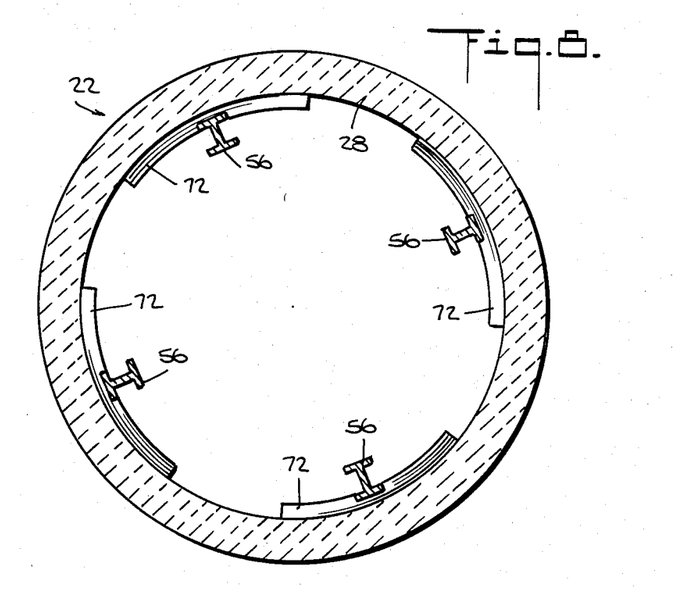
FIG. 8 is a view similar to FIG. 7 but showing the ladle and scraper blades at the end of a further step of a ladle scraping operation.

It will be appreciated from the foregoing that the inner portion 58a of the carrier body carrier assembly, including the scraper leg mounting means 66 and the scraper legs 56, may rotate in the bearing assembly 59 relative to the outer portion 58b of the carrier assembly including the rollers 60. This allows the scraper legs 56 to be positioned at and located at different circumferential sectors of the interior of the ladle 22 between successive scraping operations, as shown in FIGS. 7 and 8.

In order to hold the carrier against rotation during each scraping operation there is provided a locking key 120 as shown in FIG. 6. This key comprises a bar 122 having a pair of spaced apart stop elements 124 extending inwardly therefrom and a pair of spaced apart pins 126 extending downwardly from the bar 90. An eye 128 is mounted on top of the bar 122 for lifting. The bearing support flange 116 is provided with a series of holes 130 of a diameter sufficient to accommodate the pins 126 and spaced apart from each other by a distance equal to the spacing between the pins.

The stop elements 124 are spaced apart from each other by an amount sufficient to straddle one of the scraper leg supports 66. With the locking key 120 removed from the carrier assembly, the carrier body 76 is rotated until the scraper legs 56 are in a desired orientation relative to the ladle 22. The key is then positioned with its stop elements 124 straddling one of the scraper leg supports 66 and its pins 126 inserted into the associated holes 130 (FIGS. 3 and 6) in the bearing support flange 116. The key then will hold the carrier and legs in fixed rotational position during a scraping operation.

Figure 9:
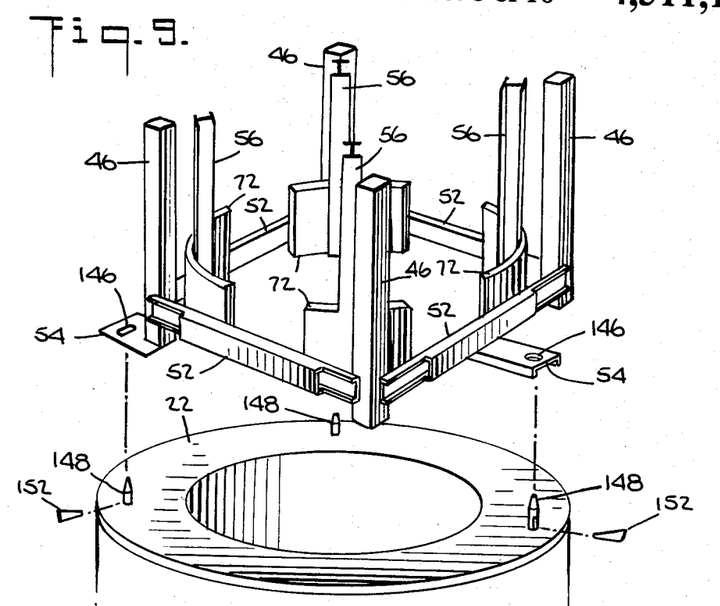
FIG. 9 is an exploded perspective view showing an attachment arrangement for attaching the ladle scraper mechanism to a ladle.
Figure 10:
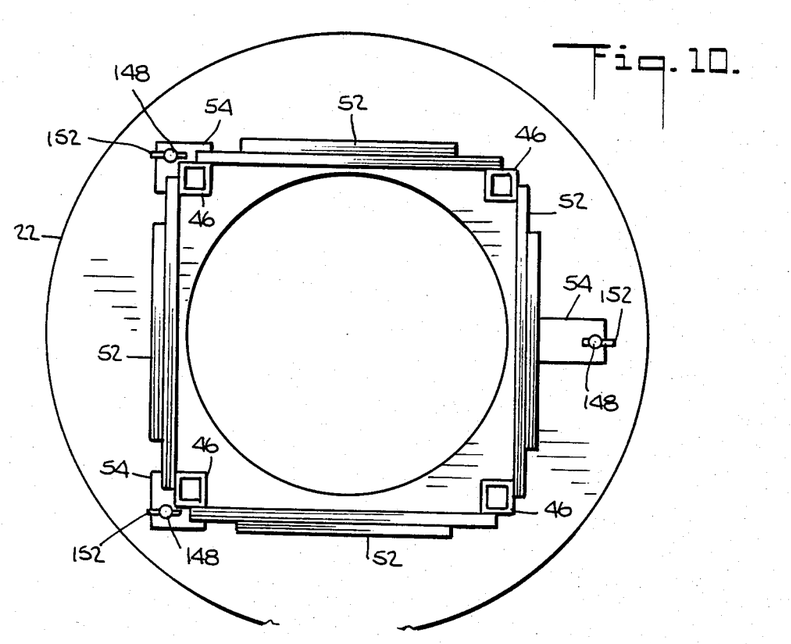
FIG. 10 is a plan view of the attachment arrangement of FIG. 9.
Figure 11:
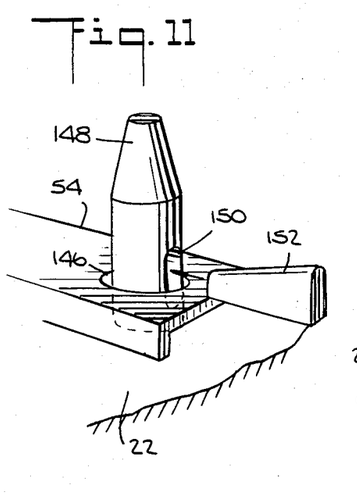
FIG. 11 is a exploded perspective view showing a wedge and cone locking mechanism used in the locking arrangment of FIG. 9.
Figure 12:
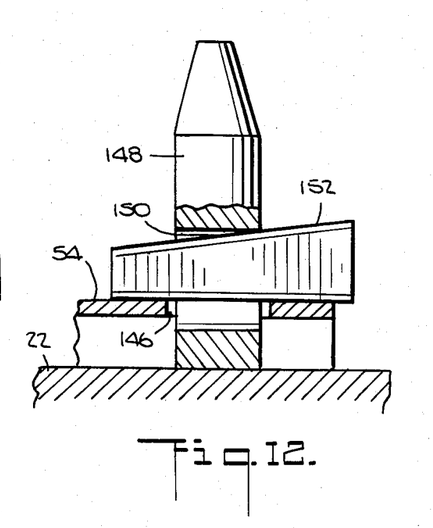
FIG. 12 is an elevational view, partially in section, of the wedge and cone locking mechanism of FIG. 9.

In order to protect the carrier assembly 58 from the effects of heat from molten metal in the ladle, a heat protector plate 132 is mounted on the inner carrier portion 58a just below the bottom plate 74 as shown in FIG. 5. Openings 134 and 136 are provided in the bottom plate 74 and heat protector plate 132 respectively to allow passage of the scraper legs 56 and a heat protector flange 138 is mounted on each scraper leg just below the openings. In addition the exhaust air lines 108 from the vibrators 70 are directed down along the length of the scraper legs 56 to assist in preventing heat buildup. The scraping mechanism 20 is held to the top of the ladle 22 during the above described scraping action by clamping arrangements shown in FIGS. 9-14. As shown in FIGS. 9 and 10, the plates 54 are welded to extend out as flange from the bottoms of two of the vertical frame legs 46 and from the center of one of the lower cross members 52. These plates are each provided with an opening 146. Pins 148 are mounted to project upwardly from the upper surface of the ladle to locations to extend through the openings 146 in respective plates when the scraping mechanism 20 is set on the ladle. As shown in FIGS. 11 and 12, the pins 148 have cross holes 150 extending through them and wedges 152 are driven through these holes to lock the plates and the scraping mechanism to the top of the ladle.

Figure 13:
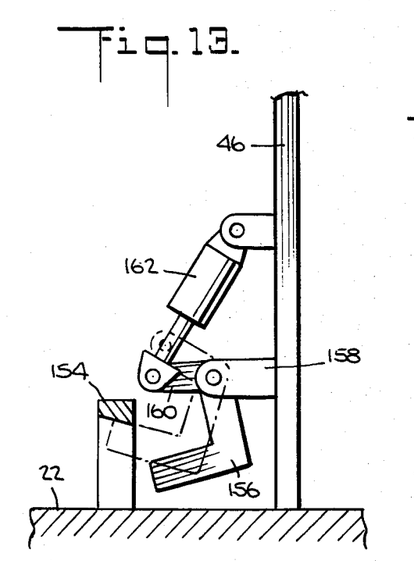
FIG. 13 is a view similar to FIG. 12 showing a first alternate locking mechanism.

FIG. 13 shows an alternate locking arrangement for locking the scraping mechanism 20 to the ladle 22. In the arrangement of FIG. 13 brackets 154 are mounted on the top of the ladle and an angle bar 156 is pivotally mounted on a bracket 158 extending out from near the bottom of one of the frame legs 46. The angle bar 156 includes a crank arm 160 and the outer end of the bar is connected to one end of a fluid (e.g. hydraulic or pneumatic) piston and cylinder assembly 162. The other end of the piston and cylinder assembly is pivotally connected to a further bracket 164 on the leg 46 a short distance above the bracket 158. By operation of the piston and cylinder assembly 162 the angle bar 156 is caused to swing under the bracket 154 on the ladle (as shown in phantom outline) to lock the scraper mechanism 20 to the ladle or to swing away from the bracket 154 (as shown in solid outline) to release the scraper mechanism from the ladle.

Figure 14:
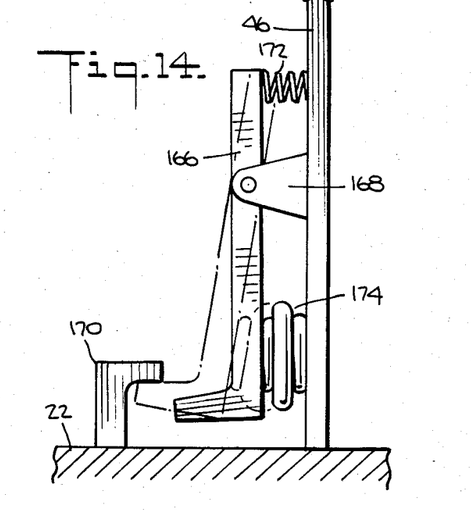
FIG. 14 is a view similar to FIG. 12 showing a second alternate locking mechanism.

FIG. 14 shows a further alternate locking arrangement for locking the scraping mechanism 20 to the ladle 22. As shown in FIG. 14, an L-shaped bar 166 is pivotally mounted on a bracket 168 extending out from near the bottom of the frame leg 46. The lower end of the bar 166 extends under a bracket 170 on the upper surface of the ladle 22 to lock the scraper mechanism to the ladle when the bar 166 is pivoted to its phantom line position. When the bar 166 is pivoted back to its solid line position its lower end is released from the bracket 170 to release the scraper mechanism from the ladle. The bar 166 is biased to its release position (shown in solid outline) by a compression spring 172 positioned between the frame leg 46 and the bar 158 above the bracket 168. A pneumatic clamp actuator 174 extends between the frame leg 44 and the bar 166 below the bracket 168 for forcing the bar to its phantom line locking position.

Figure 15:
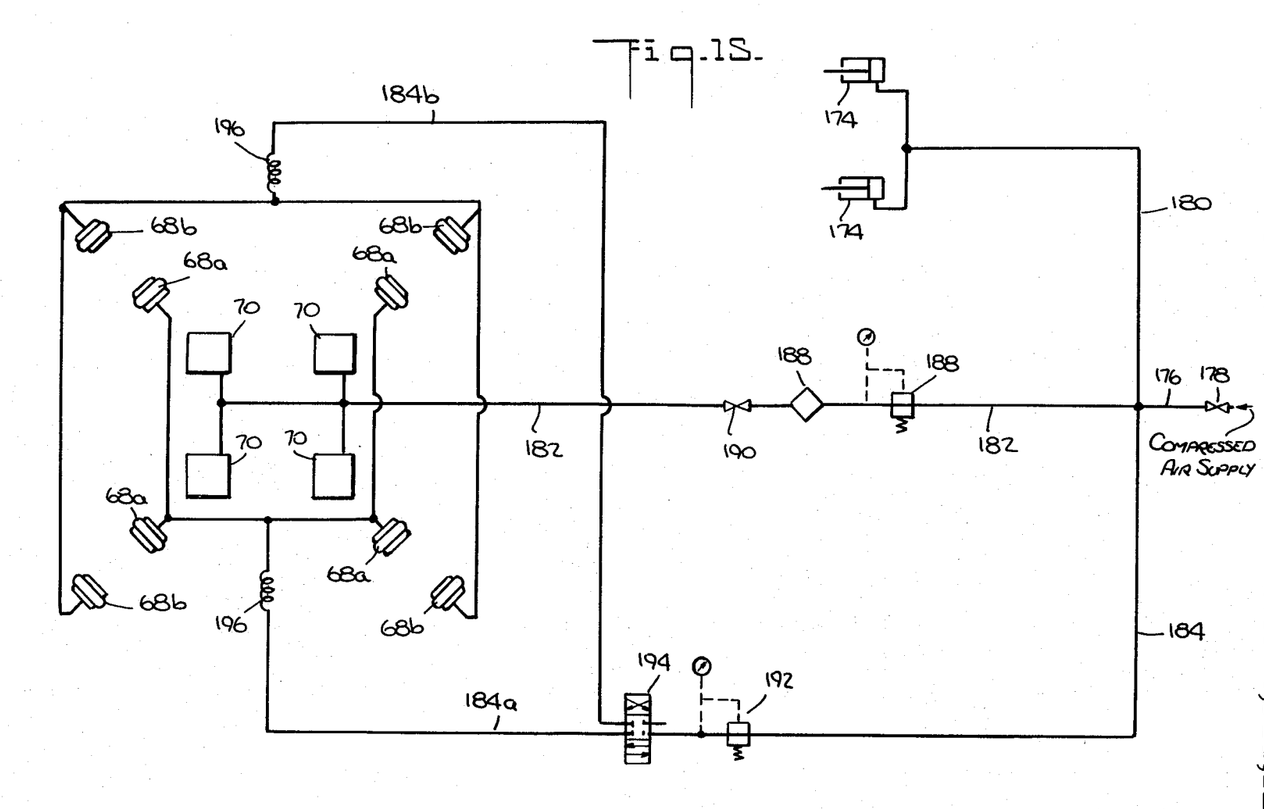
FIG. 15 is a schematic of a pneumatic system used to control actuation of clamps, radial leg actuators and vibrators used in the ladle scraper mechanism of FIG. 1.

FIG. 15 shows a schematic of an air supply system for supplying pressurized air to the pneumatic actuators 68, the air driven vibrators 70 and the clamp actuator 174 (when the clamping arrangement of FIG. 14 is utilized). As shown, pressurized air, e.g. at 80 pounds per square inch, from a suitable external supply (not shown) is applied to a main air line 176 and through a main valve 178. From there the main air line 174 branches to a clamp supply line 180, a vibrator supply line 182 and a scraper leg actuator supply line 184. The clamp supply line 180 is converted to the clamp actuators 174 to actuate them into locking condition when the main valve 178 is opened. The vibrator supply line 180 is connected through a pressure regulating valve 186, a check valve 188 and a control valve 190 to the vibrators 70. The scraper leg actuator supply line 184 is connected through a pressure regulating valve 192 and a switching valve 194 to branch lines 184a and 184b which are connected, respectively, through associatd dashpots 196 to the inner and outer scraper leg actuator elements 68a and 68b. By operating the switching valve 194, pressurized air is supplied to either the inner or outer actuator elements or 68a or 68b to force the scraper legs radially inwardly or radially outwardly.

It will be appreciated from the foregoing description that the novel ladle scraper mechanism of this invention is versatile in that it can esily be asembled onto a ladle and can readily be adapted to ladles of different size. Moreover, the mechanism is simple in construction and reliable in operation and it is especially adapted for scraping ladles while they contain a bath of molten metal.

We claim:

1. A ladle scraper mechanism for scraping incrustations off the interior wall of a ladle containing a molten metal, said mechanism comprising:
   a frame constructed to be mounted over said ladle and having at least one vertical guide;
   a carrier assembly mounted to be moved up and down in said frame and to be guided by said vertical guide;
   at least one elongated scraper leg having a scraper element at its lower end;

scraper leg mounting means for mounting the upper end of said scraper leg to said carrier assembly so that said scraper leg extends down into said ladle, said mounting means including a flexible element permitting limited vertical movement of said scraper leg relative to said carrier assembly and limited pivotal movement of said scraper leg about a horizontal axis;

an actuator mounted on said carrier assembly and arranged to exert a horizontal force on said scraper leg at a location vertically displaced from said horizontal axis to cause the lower end of the scraper leg to swing toward or away from the ladle wall being scraped; and a vibrator mounted on the upper end of said scraper leg to induce vertical vibratory motion to said leg.

2. A ladle scraper mechanism according to claim 1 wherein a cable lift is connected between said carrier assembly and the upper region of said frame.

3. A ladle scraper mechanism according to claim 1 wherein said carrier assembly comprises inner and outer portions, rotatably interconnected, with the outer portion arranged to be guided in said frame and said outer portion being provided with said scraper leg mounting means.

4. A ladle scraper mechanism according to claim 3 wherein a cable lift is connected between said inner portion and the upper region of said frame.

5. A ladle scraper mechanism according to claim 1 wherein said scraper leg mounting means comprises at least one flexible element encased in a tubular outer wall attached to said carrier, said flexible element having a central opening therethrough and a bolt extending through said central opening and connected to said scraper leg thereby to permit limited vertical movement and limited pivotal movement of said scraper leg about a horizontal axis.

6. A ladle scraper mechanism according to claim 1 wherein said vibrator is an air driven piston vibrator.

7. A ladle scraper mechanism according to claim 1 wherein said scraper leg actuators are air inflatable bellows.

8. A ladle scraper mechanism according to claim 1 wherein said frame comprises a plurality of vertical legs and wherein said carrier assembly is mounted within said legs and is provided with rollers which engage and are guided by said legs.

9. A ladle scraper mechanism according to claim 1 wherein said carrier assembly comprises an inner portion which includes said scraper leg mounting means and an outer portion which includes said rollers and a rotary connection between said inner and outer portions permitting relative rotational movement about a vertical axis.

10. A ladle scraper mechanism according to claim 9 wherein said rotary connection includes a ring type roller bearing.

11. A ladle scraper mechanism according to claim 10 wherein said frame includes a hoist having a cable which extends down from the upper end of said frame to said carrier assembly.

12. A ladle scraper mechanism according to claim 11 wherein said cable is connected to the inner portion of said carrier assembly.

13. A ladle scraper mechanism according to claim 1 wherein said frame is provided with flange-like plates at the bottom thereof, mounting pins arranged to extend up from the top of a ladle through holes in said plates and wedges forced into cross holes in said pins above said plates.

14. A ladle scraper mechanism according to claim 1 wherein said frame is provided with angle brackets pivotally mounted on the lower portion of the legs of said frame to swing out and engage brackets on the top of a ladle and means to control the swinging of said angle brackets.

15. A ladle scraper mechanism according to claim 14 wherein said means to control the swinging of said angle bracket is a fluid piston and cylinder assembly connected between a crank arm on the angle bracket and said frame leg.

16. A ladle scraper mechanism according to claim 14 wherein said means to control the swinging of said angle bracket is a spring arranged between said angle bracket and said frame leg to force the portion of said angle bracket above its pivot to swing outwardly and a pneumatic bellows type actuator arranged between said angle bracket and said frame leg below said pivot to cause the portion of said angle bracket below its pivot to swing outwardly.

17. A ladle scraper mechanism according to claim 9 wherein said inner and outer carrier assembly portions are lockable to prevent relative rotation during a scraping operation.

18. A ladle scraper mechanism according to claim 17 wherein said carrier assembly includes a removeable key interconnecting said inner and outer portions.

19. A ladle scraper mechanism according to claim 18 wherein said key comprises a bar having pins which fit into openings in said outer carrier assembly portion and stop elements extending from said bar to engage elements on said inner carrier assembly portion.

* * * * *

UNITED STATES PATENT AND TRADEMARK OFFICE
CERTIFICATE OF CORRECTION

PATENT NO.  : 4,511,125
DATED       : April 16, 1985
INVENTOR(S) : Otto Hochstrasser, Hans G. Heine and Heinz Buechi It is certified that error appears in the above-identified patent and that said Letters Patent is hereby corrected as shown below:

COLUMN 1, line 68, "wich" to read -- which --;
COLUMN 6, line 51, "14" to read -- 114 --;
COLUMN 8, line 43, "associatd" to read -- associated --;
         line 51, "esily" to read -- easily --;
         line 51, "asembled" to read assembled --.

Signed and Sealed this

Fifteenth Day of October 1985

[SEAL]

Attest:

Attesting Officer

DONALD J. QUIGG

Commissioner of Patents and
Trademarks—Designate